United States Patent [19]
Jeon

[11] Patent Number: 5,920,637
[45] Date of Patent: Jul. 6, 1999

[54] AUDIO INDUCED INTERFERENCE SUPPRESSION APPARATUS FOR VIDEO DISPLAY APPLIANCES

[75] Inventor: Chang Wook Jeon, Kyoungsangbuk-Do, Rep. of Korea

[73] Assignee: LG Electronics Inc., Seoul, Rep. of Korea

[21] Appl. No.: 08/740,152

[22] Filed: Oct. 28, 1996

[30] Foreign Application Priority Data

Nov. 6, 1995 [KR] Rep. of Korea ...................... 95-39848

[51] Int. Cl.⁶ .................................................. H04R 25/00
[52] U.S. Cl. ........................... 381/388; 381/354; 361/682
[58] Field of Search ............................ 381/87, 354, 353, 381/395, 388, 333, 306, 392; 361/681, 682, 683; 248/638, 639, 917, 918, 919, 920, 921

[56] References Cited

U.S. PATENT DOCUMENTS 4,926,487  5/1990  Yoshida et al. .
5,587,876  12/1996  O'Brien et al. ........................ 361/682
5,689,574  11/1997  Heirich et al. ............................ 381/87

FOREIGN PATENT DOCUMENTS 2297010  7/1996  United Kingdom .

*Primary Examiner*—Huyen Le
*Attorney, Agent, or Firm*—Oppenheimer Wolff & Donnelly LLP

[57] ABSTRACT

An audio induced interference suppression apparatus for a video display appliance capable of suppressing an audio induced interference which may be produced in a color picture tube (CPT) due to the transfer of vibrations arising from the output of a loudspeaker by absorbing and dampening the vibrations to be transferred to the CPT. The apparatus includes a CPT main body, a vibration-absorbing plate, attached to a bottom of the main body, for absorbing vibrations transferred to the main body, a supporter, fixed to a bottom of the vibration-absorbing plate, for supporting the main body, a tilting swivel which is in spherical contact with a bottom of the supporter to adjust tilting and rotation of the main body, and loudspeaker cases fixed to both sides of the supporter.

7 Claims, 5 Drawing Sheets

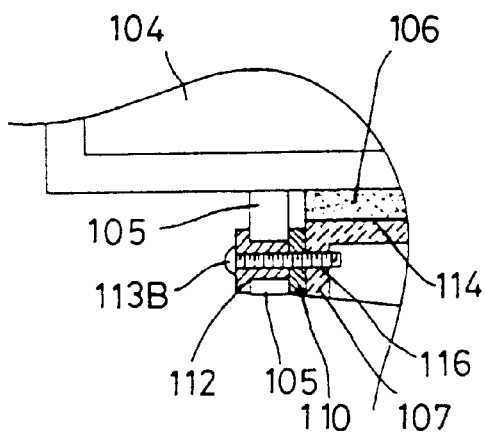
FIG. 6A　SECTION X
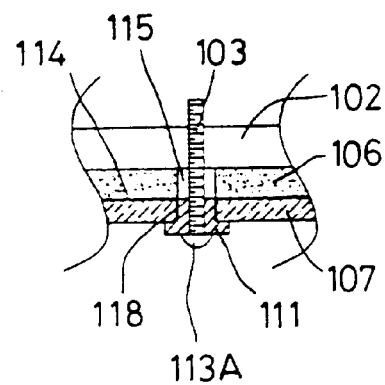
FIG. 6B　SECTION Y
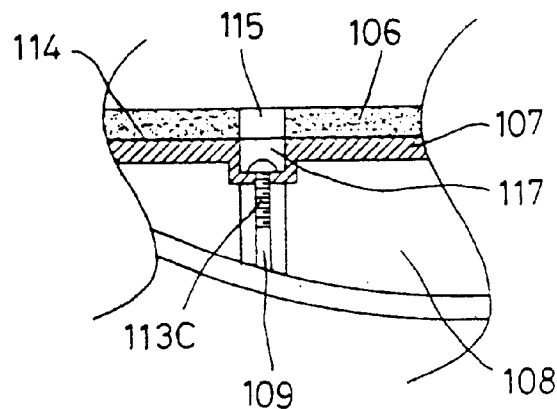
FIG. 6C　SECTION Z

AUDIO INDUCED INTERFERENCE SUPPRESSION APPARATUS FOR VIDEO DISPLAY APPLIANCES

BACKGROUND OF THE INVENTION

1. Field of the Invention

The present invention relates to the suppression of an audio induced interference for video display appliances. In particular, the present invention relates to an apparatus for suppressing the audio induced interference which may be produced in a color picture tube due to the transfer of vibrations arising from the output of a loudspeaker provided in a loudspeaker case directly adjacent to the color picture tube by absorbing and dampening the vibrations generated from the loudspeaker.

2. Description of the Prior Art

Video display appliances such as monitors, television receivers, etc., are typically provided with a color picture tube (CPT). Such video display appliances may be also provided with at least one loudspeaker for the output of sound.

FIGS. 1 to 3 are views illustrating a conventional video display appliance in an assembled state.

Referring to FIGS. 1 to 3, the conventional video display appliance comprises a main body 60 provided with a color picture tube (CPT) 1, a cabinet 10 assembled with the CPT 1, and a back cover 20 assembled with the cabinet 10 by being secured to the rear of the CPT 1; a tilting swivel 30 mounted on the bottom portion of the main body 60, for adjusting the right and left rotation and the upward and downward tilting of the main body 60; and loudspeaker cases 50, provided on both sides of the main body 60, for protectively supporting loudspeakers 40 respectively installed therein.

Referring again to FIG. 3, the cabinet 10 is provided with CPT-fastening bosses 11, formed inside the cabinet 10, for fastening to CPT lugs 2 formed on a CPT 1 by fastening screws 3A, and back cover fastening bosses 12 projected from inner sides of the cabinet 10 so as to be fastened to a back cover 20.

The back cover 20 is provided with fastening holes 21 formed on both sides of the back cover 20 to fix the loudspeaker cases 50 to the back cover 20 by fastening screws 3B passing therethrough, and cabinet-fastening bosses 22 projected from inner sides of the back cover 20 so as to be fastened to the back cover fastening bosses 12 by fastening screws 3C.

The loudspeaker case 50 is provided with inner and outer walls 51 and 52 for surrounding the loudspeaker 40, through holes 53, formed on the loudspeaker case 50, for fitting with the fastening holes 21 to fix the loudspeaker case 50 to the back cover 20 by fastening screws 3B, loudspeaker fastening bosses 54 projected from the inner side of the loudspeaker case 50 to fix the loudspeaker 40 thereto by fastening screws 3D, and loudspeaker grilles 55 provided on the front of the loudspeaker case 50 to pass therethrough the sound outputted from the loudspeaker 40.

In the drawing, the numeral 56 denotes an inner cover fastening hole.

According to the conventional video display appliance as constructed above, the CPT lugs 2 projected from both sides of the CPT 1 mate with and are fastened to the CPT fastening bosses 11 projected from the inside of the cabinet 10 by the fastening screws 3A, resulting in that the cabinet 10 is assembled on the front of the CPT 1.

Thereafter, the cabinet fastening bosses 22 projected from both inner sides of the back cover 20 mate with and are fastened to the back cover fastening bosses 12 projected from both inner sides of the cabinet 10 by the fastening screws 3C, so that the back cover 20 on whose lower part the tilting swivel 30 is assembled is fastened to the cabinet, covering the rear portion of the CPT 1.

Meanwhile, the loudspeaker 40 mates with and is fastened to the loudspeaker fastening bosses 54 projected from the inner side 51 of the loudspeaker case 50 by the fastening screws 3D, so that the loudspeaker 40 is fixed inside the loudspeaker case 50.

At this time, after the loudspeaker cases 50 in which the loudspeakers 40 are respectively fixed are brought into contact with both sides of the back cover 20 and the cabinet 10 assembled on the CPT 1, the fastening holes formed on both sides of the back cover 20 mate with the through holes 53 formed through the inside and outside surfaces 51 and 52 of the loudspeaker case 50, a fastening screw 3B is inserted into and secured to the fastening hole 21 and the through hole 53, so that the cabinet 10, the back cover 20, and the loudspeaker case 50 are completely assembled together as shown in FIG. 2.

When the conventional video display appliance as constructed above operates, video information is displayed on the CPT 1 and an audio signal from the loudspeaker 40 is outputted through the loudspeaker grille 55 provided on the front of the loudspeaker case 50. At this time, vibrations which correspond to the level of the outputted audio signal are produced from the loudspeaker 40 and directly transferred to the CPT 1.

The tilting swivel 30 adjusts the right and left rotation and the upward and downward tilting of the main body 60 of the video display appliance. However, the tilting swivel 30 cannot serve as a vibration absorbing or reducing device.

The vibrations produced from the loudspeaker 40, as shown in FIG. 3, are transferred to the loudspeaker fastening boss 54 through the screw 30 which is fastened to the loudspeaker fastening boss 54 projected from the loudspeaker case 50 to fix the loudspeaker 40 thereto, and then are transferred to the screw 3E fastened through the through hole 53 via the outer surface 52 of the loudspeaker case 50.

Thereafter, the vibrations having reached the screw 3E secured through the through hole 56 of the loudspeaker case 50 pass through the inner side surface 51 and then are transferred to the screw 3B through the contacted surface ("C" portion of FIG. 3) of the back cover 20 and the loudspeaker case 50 and/or through the screw 3B fastened through the fastening hole 21 of the back cover 20 and the through hole 53 of the loudspeaker case 50.

The vibrations having reached the back cover 20 are transferred to the cabinet 10 through the screw 3C fixed to the back cover fastening boss 12 projected from both sides of the cabinet 10 and the cabinet fastening boss 22 on both sides of the back cover 20, and then along the contacted surface ("B" portion of FIG. 3) of the cabinet 10 and the back cover 20 assembled together. The vibrations transferred to the cabinet 10 are then transferred to the CPT lug 2 through the screw 3A fastened to the CPT fastening boss 11 and reach a shadow mask provided on the CPT, passing through the contacted surface ("A" portion of FIG. 3) of the CPT 1 and the cabinet 10.

At this time, three electron beams for red, green, and blue colors, which are emitted from electron guns of the CPT 1, are directed to the fluorescent screen of the CPT 1 through beam-passing apertures provided on the shadow mask. The electron beams are affected by the vibrations transferred to the shadow mask, and thereby the interference, i.e., the howling phenomenon is produced on the screen of the CPT 1.

The interference deteriorates the picture quality and fatigues a user's eyes easily. Further, it limits the scale of the CPT screen and the output level of the loudspeaker.

SUMMARY OF THE INVENTION

The present invention has been made to solve the problems involved in the prior art. Therefore, it is an object of the present invention to provide an audio induced interference suppression apparatus for a video display appliance which can completely absorb and dampen vibrations transferred from the loudspeaker and thus remove the interference produced on a color picture tube.

In order to achieve the above object, there is provided an audio induced interference suppression apparatus for a video display appliance comprising:

a main body of a color picture tube;

vibration-absorbing means, coupled to a bottom of said main body, for absorbing vibrations generated and propagated from a loudspeaker to said main body;

supporting means, coupled to a bottom of said vibration-absorbing means, for supporting said main body;

tilting and rotation adjustment means, coupled to and being in spherical contact with a bottom of said supporting means, for adjusting tilting and rotation of said main body; and loudspeaker cases installed on both sides of said main body, and fixed to both sides of said supporting means.

BRIEF DESCRIPTION OF THE DRAWINGS

The above objects, other features, and advantages of the present invention will become more apparent through the following description of the preferred embodiments of the present invention made with reference to the attached drawings, in which:

FIGS. 6A to 6C are sectional views illustrating main parts of the interference suppression apparatus according to the present invention.

DETAILED DESCRIPTION OF THE PREFERRED EMBODIMENTS

FIGS. 4 to 7 show the embodiments of the present invention.

Figure 1:
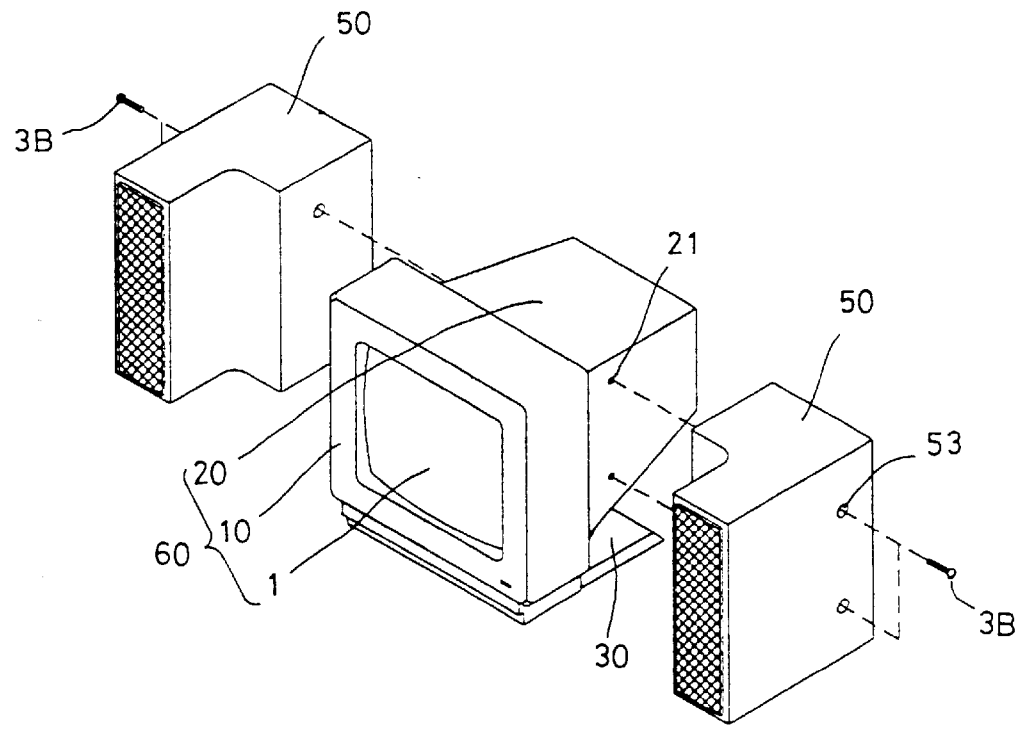
FIG. 1 is an exploded perspective view of a conventional video display appliance in which loudspeakers are installed.
Figure 2:
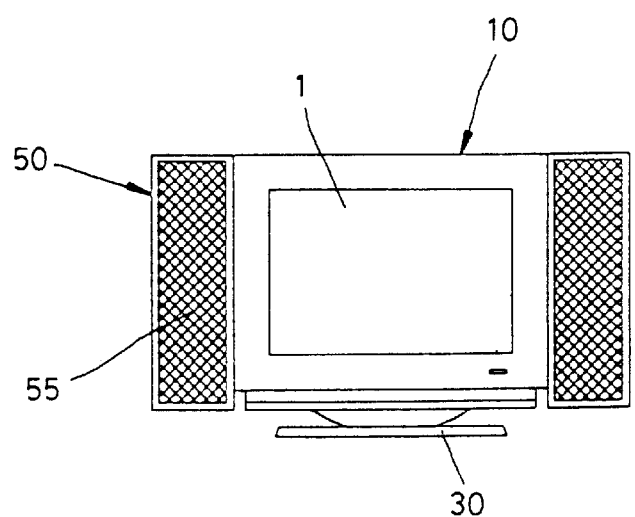
FIG. 2 is a front view of the conventional video display appliance of FIG. 1.
Figure 3:
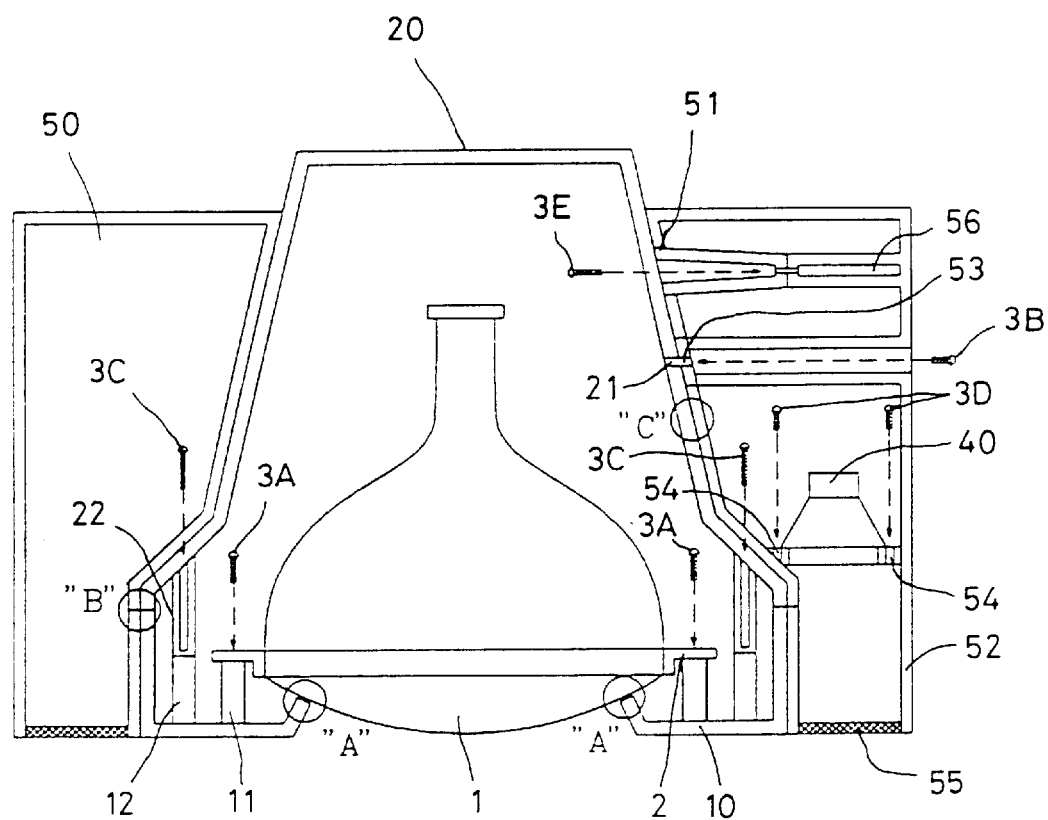
FIG. 3 is a sectional view of the conventional video display appliance of FIG. 1.
Figure 4:
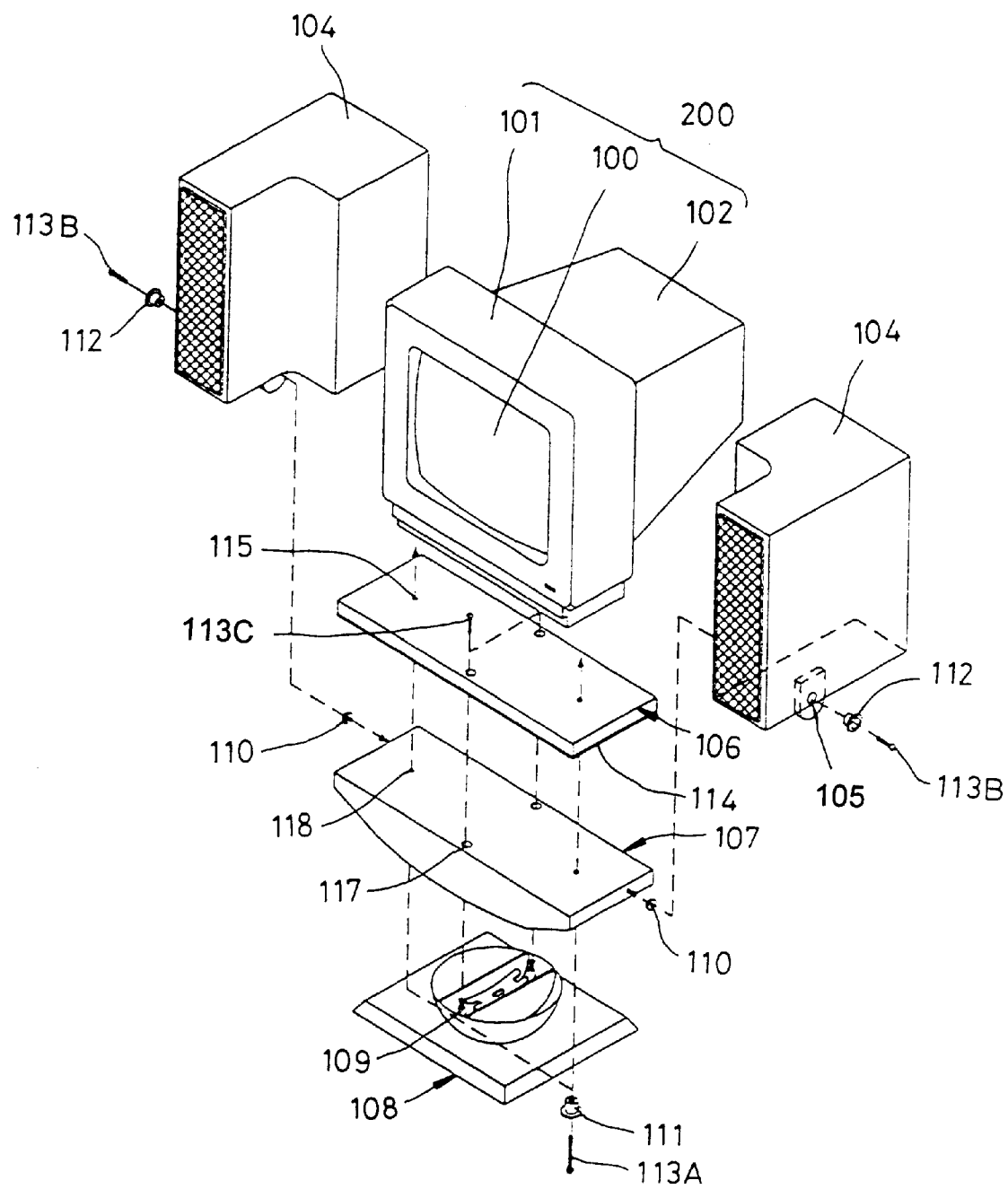
FIG. 4 is an exploded perspective view of the interference suppression apparatus for a video display appliance according to one embodiment of the present invention.

Referring to FIG. 4, the audio induced interference suppression system according to the present invention includes a CPT main body 200 composed of a CPT 100, a cabinet 101 assembled on the front of the CPT 100, and a back cover 102 assembled with the cabinet 101 by being secured to the rear of the CPT 100, the back cover 102 having a plurality of fastening holes formed on its bottom; a vibration-absorbing plate 106, fixed to the bottom of the main body 200, for absorbing the vibration components to be transferred to the main body 200; a support 107, fixed to the bottom of the vibration-absorbing plate 106, for supporting the main body 200, a tilting swivel 108, assembled with and being in spherical contact with the bottom of the supporter 107, for acting as a tilting and rotation adjustment device for adjusting the right and left rotation and the upward and downward tilting of the main body 200; and a loudspeaker case 104 provided on both sides of the main body 200, and fixed to both side portions of the supporter 107.

Preferably, the main body 200, the vibration-absorbing plate 106, and the supporter 107 are tightly secured together by being fastened by a fastening device such as a plurality of screws 113A which pass through the supporter 107 and the vibration-absorbing plate 106 and are fastened to the fastening holes 103 formed on the bottom of the main body 200. Between the head portion of the screw 113A and the bottom surface of the supporter are inserted vibration buffering members 111 such as rubber packings.

Also, the loudspeaker case 104 is fixed to the supporter 107 in such a manner that a fastening device such as a screw 113B which passes through and is fastened to the fastening hole 105 formed on the loudspeaker case 104 and the through hole 109 formed on the both sides of the supporter 107. Between the head portion of the screw 113B and the adjacent outer surface of the loudspeaker case 104, and between both sides of the supporter 107 and the adjacent inner surface of the loudspeaker case 104, are respectively inserted vibration buffering members 112 and 110 such as rubber packings.

Here, the vibration-absorbing plate 106 is provided with an adhesive tape 114 for adhesively attaching the plate 106 to the upper surface of the supporter 107 and a plurality of through holes 115 formed on the plate 106 to pass the screws 113A and 113C therethrough.

After the supporter 107 is firmly attached to the bottom surface of the vibration-absorbing plate 106, on which the through holes 115 are formed, by the adhesive tape 114, the bottom surface of the supporter 107 is mounted on the tilting swivel 108.

Thereafter, as shown in FIG. 6C, a screw 113C is fastened to the supporter mounting hole 109 of the tilting swivel 108, penetrating the through hole 115 of the plate 106 and the tilting swivel fastening hole 117 formed on the center portion of the supporter 107, causing the plate 106, the supporter 107, and the tilting swivel 108 to be completely assembled together.

In the meantime, the plate 106, the supporter 107, and the tilting swivel 108, which are assembled together, are attached to the bottom portions of the cabinet 101 and the back cover 102, which are assembled with the CPT 100, and then secured thereto by the screw 113A as shown in FIG. 6B in such a manner that the screw 113A, via the rubber packing 111, is fastened to the fastening hole 103 formed on the bottom of the back cover 102 through the fastening hole 118 of the supporter 107 and the through hole 115 of the vibration-absorbing plate 106, causing the cabinet 101, the back cover 102, the vibration-absorbing plate 106, the supporter 107, and the tilting swivel 108 are completely assembled together.

Thereafter, as shown in FIG. 6A, the rubber packing 110 is inserted into the loudspeaker case fastening hole 116 formed on each side of the supporter 107, the loudspeaker case 104 is contacted with the completely assembled CPT 100, and then the fastening hole 105 formed on the lower portion of the loudspeaker case 104 is put on the rubber packing 110 inserted into the loudspeaker case fastening hole 116.

Figure 5:
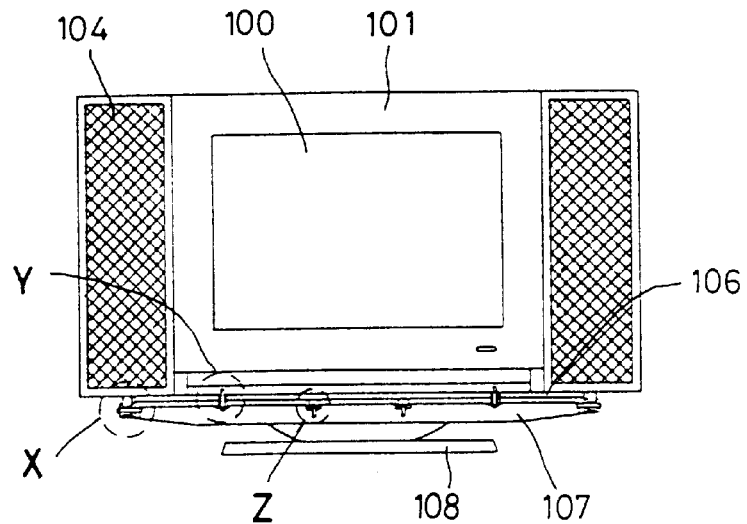
FIG. 5 is a front view of the interference suppression apparatus for a video display appliance of FIG. 4.

Thereafter, the screw 113B is secured to the loudspeaker case fastening hole 116 through the rubber packing 110 and the fastening hole 105. FIG. 5 shows the video display appliance in a completely assembled state.

When the video display appliance assembled as above operates, the vibrations generated and propagated from the loudspeaker installed in the loudspeaker case 10 are firstly absorbed through the rubber packing 112 fitting into the fastening hole 105 formed on the bottom of the loudspeaker case 104 and the rubber packing 110 firmly attached to each side of the supporter 107.

The remaining vibrations having reached the supporter 107 are then transferred to the back cover 102 of the main body after being secondly absorbed and dampened through the vibration absorbing plate 106 attached to the upper surface of the supporter 107, and the rubber packing 111 secured through the fastening hole 118 of the supporter 107 by the screw 113A.

The vibrations having reached the back cover 102 are then transferred to the cabinet 101. However, the remaining vibrations having reached the cabinet 101 are almost extinguished by the rubber packings 110, 111, and 112, and the vibration absorbing plate 106 as described above, and do not affect the operation of the CPT 100 assembled with cabinet 101 and the back cover 102, preventing the interference, i.e., the howling phenomena, from being produced on the CPT 100.

Figure 7:
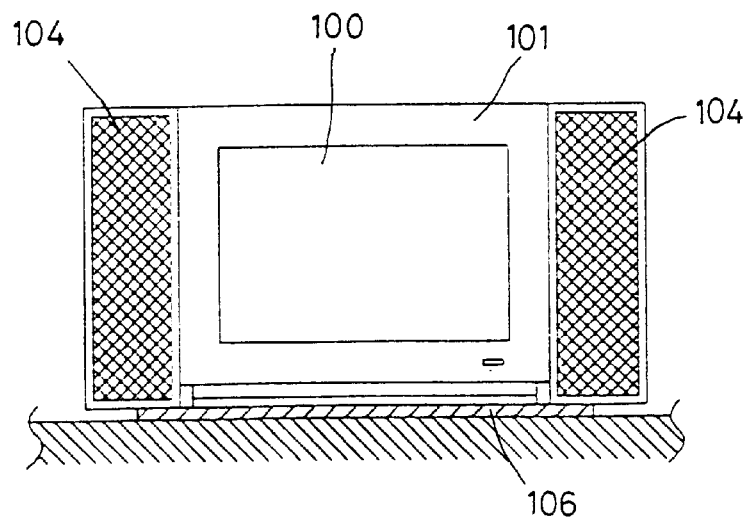
FIG. 7 is a front view of the interference suppression apparatus for a video display appliance according to another embodiment of the present invention.

FIG. 7 illustrates the audio induced interference suppression apparatus for a video display appliance according to another embodiment of the present invention. Referring to FIG. 7, the supporter 107 and the tilting swivel 108 are omitted, and the vibration-absorbing plate 106 is attached to the bottom of the video display appliance, so that the appliance is directly put on a desk or a working table when in use. The same effect as in the embodiment previously described can be achieved.

From the foregoing, it will be apparent that the present audio induced interference suppression apparatus provides the advantages in that it can effectively absorb and dampen the vibrations generated from the output of the loudspeaker, and thus remove the interference produced on the CPT by the transfer of the vibrations directly to the CPT, thereby improving the picture quality.

While the present invention has been described and illustrated herein with reference to the preferred embodiments thereof, it will be understood by those skilled in the art that various changes in form and details may be made therein without departing from the spirit and scope of the invention.

What is claimed is:

1. An audio induced interference suppression apparatus for a video display appliance comprising:

a main body of a color picture tube;

vibration-absorbing means, coupled to a bottom of said main body, for absorbing vibrations generated and propagated from a loudspeaker to said main body;

supporting means, coupled to a bottom of said vibration-absorbing means, for supporting said main body;

tilting and rotation adjustment means, coupled to and being in spherical contact with a bottom of said supporting means, for adjusting tilting and rotation of said main body;

loudspeaker cases installed on both sides of said main body, and fixed to both sides of said supporting means;

wherein said main body, vibration-absorbing means and supporting means are assembled together by a first fixing means secured to a plurality of fixing holes formed on a bottom of said main body through said supporting means and said vibration-absorbing means; and wherein a first vibration-buffering means is inserted between a head portion of said first fixing means and a bottom surface of said supporting means.

2. An audio induced interference suppression apparatus as claimed in claim 1, wherein said first fixing means comprises fixing screws.

3. An audio induced interference suppression apparatus as claimed in claim 1, wherein said first vibration-buffering means comprises rubber packings.

4. An audio induced interference suppression apparatus for a video display appliance comprising:

a main body of a color picture tube;

vibration-absorbing means, coupled to a bottom of said main body, for absorbing vibrations generated and propagated from a loudspeaker to said main body;

supporting means, coupled to a bottom of said vibration-absorbing means, for supporting said main body;

tilting and rotation adjustment means, coupled to and being in spherical contact with a bottom of said supporting means, for adjusting tilting and rotation of said main body;

loudspeaker cases containing speakers and audio equipment installed on both sides of said main body, and fixed to both sides of said supporting means;

wherein said loudspeaker cases containing speakers and having separate housings, are externally placed adjacent to each side of said main body;

wherein said loudspeaker cases are fixed externally to said supporting means by a fixing means secured to fixing holes formed on both sides of said supporting means through fastening holes formed on the bottom of said loudspeaker cases; and wherein a vibration-buffering means is inserted between a head portion of said fixing means and an outer surface of said loudspeaker case, and between said side of said supporting means and an inner surface of said loudspeaker case, respectively.

5. An audio induced interference suppression apparatus as claimed in claim 4, wherein said fixing means comprises fixing screws.

6. An audio induced interference suppression apparatus as claimed in claim 4, wherein said vibration-buffering means comprises rubber packings.

7. An audio induced interference suppression apparatus for a video display appliance comprising:

a main body of a color picture tube;

vibration-absorbing means, coupled to a bottom of said main body, for absorbing vibrations generated and propagated from a loudspeaker to said main body;

supporting means, coupled to a bottom of said vibration-absorbing means, for supporting said main body;

loudspeaker cases containing speakers installed on both sides of said main body, and fixed externally to both sides of said supporting means;

wherein said loudspeaker cases containing speakers and having separate housings, are externally placed adjacent to each side of said main body; and wherein said loudspeaker cases are fixed to said supporting means by resilient audio frequency suppression mounting arrangements.

* * * * *